(12) United States Patent
Miyazawa

(10) Patent No.: US 7,284,938 B1
(45) Date of Patent: Oct. 23, 2007

(54) TOOL HOLDER ATTACHMENT STRUCTURE

(75) Inventor: Hiroshi Miyazawa, Akasahi (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 10/019,425

(22) PCT Filed: Apr. 10, 2000

(86) PCT No.: PCT/JP00/02339

§ 371 (c)(1),
(2), (4) Date: Oct. 28, 2004

(87) PCT Pub. No.: WO01/76815

PCT Pub. Date: Oct. 18, 2001

(51) Int. Cl.
*B23Q 3/12* (2006.01)
(52) U.S. Cl. ...................... 409/231; 409/141
(58) Field of Classification Search ........ 409/231–234, 409/141; 408/238, 239 A; *B23Q 3/12*
See application file for complete search history.

(56) References Cited

U.S. PATENT DOCUMENTS

| 3,041,898 | A | * | 7/1962 | Better ..................... 408/238 |
| 3,119,625 | A | * | 1/1964 | Marr ........................ 279/16 |
| 5,026,224 | A | * | 6/1991 | Andersson et al. ......... 409/234 |
| 5,322,304 | A | * | 6/1994 | Rivin ........................ 279/103 |
| 5,997,226 | A | * | 12/1999 | Tagami ..................... 409/231 |
| 6,553,876 | B2 | * | 4/2003 | Hochuli et al. ............ 82/147 |
| 6,599,068 | B1 | * | 7/2003 | Miyazawa ................. 409/234 |
| 2003/0103828 | A1 | * | 6/2003 | Kitaura ..................... 409/234 |

FOREIGN PATENT DOCUMENTS

| DE | 4003167 A1 | * | 9/1990 |
| DE | 4004150 A1 | * | 9/1990 |
| JP | 56033207 A | * | 4/1981 |
| JP | 62044350 A | * | 2/1987 |
| JP | 03251302 A | * | 11/1991 |
| JP | 06226515 A | * | 8/1994 |
| JP | 07-096437 | | 4/1995 |
| JP | 8-108302 | | 4/1996 |
| JP | 08155774 A | * | 6/1996 |
| JP | 9-248727 | | 9/1997 |

* cited by examiner

*Primary Examiner*—Daniel W. Howell
(74) *Attorney, Agent, or Firm*—Darby & Darby P.C.

(57) ABSTRACT

A main shaft includes a plurality of elastic engagement pieces arrayed along an outer perimeter of an attachment hole. During and after assembly, the elastic engagement pieces elastically abut at least an outer surface of a tapered shank in a tool holder and deform slightly in a radial direction. The elastic engagement pieces provide uniform engagement force between the main shaft and the tool holder over a broad surface area. An elastic flange provides additional elastic engagement and easy separation from the main shaft. Together, the elastic engagement pieces and elastic flange reliably engage and securely attach the main shaft to the tool holder while aiding disengagement.

13 Claims, 5 Drawing Sheets

TOOL HOLDER ATTACHMENT STRUCTURE

The present application claims the benefit of International Application No. PCT/JP00/02339, filed Apr. 10, 2000, which is hereby incorporated by reference in its entirety.

BACKGROUND OF THE INVENTION

1. Field of the Invention

The present invention relates to a tool holder that reliably secures a tool along a main shaft of a machine tool.

2. Description of the Related Art

Conventionally a tool holder is attached to the end of a main shaft to support a tool. This type of attachment is used in various machine tools including drill presses, milling machines, and machining centers.

With conventional tool holders, a main shaft rotates the tool to perform machining on a workpiece. Since the tool holder is removably attached to the main shaft, the main shaft is equipped with a retraction mechanism to draw in and secure a shank of the tool holder.

Conventional tool holders include a tool support section for attaching a tool, a shank including a tapered outer perimeter surface, a pull stud secured to the shank, and a flange having a larger diameter than the tapered hole.

Conventionally, the retraction mechanism pulls in the tool holder and fits and secures the shank to the tapered hole of the main shaft.

Unfortunately, high machining precision, of 1 micron error or less, is demanded from recent machining tools. During use, machining tools must operate while rotating the main shaft at high speeds of 30,000-40,000 rpm.

Consequently, the tool holder and the main shaft (rotating at high speeds) undergo undesirable rotary vibrations, which are a factor in degrading machining precision.

To minimize precision loss, it is desirable to increase securing strength by tightly securing the entire shank of the tool holder against the tapered hole of the main shaft. Unfortunately, due to machining tolerances in the tapered hole of the main shaft and the tool holder, the tool can heat up during use, resulting in detrimental thermal expansion of both the main shaft and the tool holder. Detrimental thermal expansion makes it impossible to secure the entire shank of the tool holder firmly and tightly against the tapered hole of the main shaft.

It is also impossible to abut the flange of the tool holder tightly to the end surface of the main shaft while having the shank of the tool holder tightly secured in the tapered hole of the main shaft. Consequently, conventional tool holders are not designed to abut its flange on the end surface of the main shaft.

Japanese laid-open patent publication number 8-108302 discloses a tool holder which includes a main holder unit having a shank and a flange. A sleeve is outwardly fitted to the shank so that it can move along an axial direction relative to the shank. The sleeve also has an outer perimeter surface with the same tapered shape as the tapered hole of the shank. An elastic member is interposed between the flange and the sleeve.

The sleeve is divided at one section along the perimeter, with the elastic body mounted in the resulting gap. When the retraction mechanism draws in the tool holder, the flange abuts the end surface of the main shaft. The sleeve is elastically pressed by the elastic member toward the base end of the main shaft. The sleeve is narrowed and engages the tapered hole and couples with the shank.

Japanese laid-open patent publication number 9-248727 discloses a tool holder, formed as described above, but instead of the sleeve with a division at one section, a sleeve with an inner groove at one section along the perimeter is used. With both above-described tool holders, the overall sleeve diameter is narrowed when the retraction mechanism pulls in the tool holder. As a result of this narrowing, the tapered outer perimeter surface of the sleeve cannot be tightly fitted and secured against the tapered hole. This makes it difficult to have a uniform contact force over the entire perimeter and provide secure coupling with the inner surface of the tapered hole. As a further detriment to this design, an increased number of parts is required and the structure is correspondingly complex, thus increasing manufacturing costs.

In a tool holder presented in Japanese laid-open patent publication number 7-96437, a ring-shaped groove is formed at the boundary between the shank and the flange. The ring-shaped groove allows a section of the flange to have a reduced thickness. When the tool holder is drawn in by the retraction mechanism, the flange abuts the end surface of the main shaft and is elastically deformed slightly, and acts as a disc spring. This mechanism engages the shank and the tapered hole. Unfortunately, the structure of the shank is the same as previous conventional shank structures, and roughly the same problems therefore exist as in conventional tool holders.

OBJECTS AND SUMMARY OF THE INVENTION

It is an object of the present invention to provide a tool holder attachment structure which overcomes the drawbacks of the related art noted above.

It is another object of the present invention to provide a tool holder attachment structure which provides both a firm and elastic fit of an entire shank in a tapered attachment hole of a main shaft.

It is another object of the present invention to provide a tool holder attachment structure which allows a flange to elastically abut an outer end surface of a main shaft.

It is another object of the present invention to provide a tool holder attachment structure which prevents vibration, greatly increases stability, and prevents loosening during use.

It is another object of the present invention to provide a structure wherein have the elastic engagement pieces are sloped relative to a plane perpendicular to the axial center of the main shaft. It is additionally desirable to have the elastic engagement pieces sloped toward a wider end of a tapered shape of the attachment hole or alternatively formed parallel to a plane perpendicular to the axial center of the main shaft.

It is another object of the present invention to provide a plurality of ring-shaped grooves formed on the inner surface section of the attachment hole of the main shaft at a predetermined interval along the axial center, the plurality of ring-shaped grooves and the plurality of elastic engagement pieces being arranged in an alternating manner along the axial center. The formation of the plurality of ring-shaped grooves allowing the plurality of elastic engagement pieces to be formed integrally with the main shaft.

The present invention relates to a tool holder attachment structure where a main shaft includes a plurality of elastic engagement pieces arrayed along an inner perimeter surface of an attachment hole. During and after assembly, the elastic engagement pieces elastically abut at least an outer surface of a tapered shank in a tool holder and deform slightly in a radial direction. The elastic engagement pieces provide uniform engagement force between the main shaft and the tool holder over a broad surface area. An elastic flange provides additional elastic engagement and easy separation from the main shaft. Together, the elastic engagement pieces and elastic flange reliably engage and securely attach the main shaft to the tool holder while aiding disengagement.

According to an embodiment of the present invention there is provided a tool holder attachment structure, for removably securing a tool holder with a tool in a tapered attachment hole of main shaft of a machining tool, comprising: a shank having a tapered outer perimeter surface, the shank provided on the tool holder, a plurality of elastic engagement pieces abutting an outer perimeter surface of the tool holder and being elastically deformable in a radial direction during a fitting, the plurality of elastic engagement pieces disposed at an inner surface section of the tapered attachment hole of the main shaft, and the shank in the tapered attachment hole of the main shaft and the tool holder secured to the main shaft during the fitting with the plurality of elastic engagement pieces elastically deformed in the radial direction.

According to another embodiment of the present invention there is provided a tool holder attachment structure, further comprising: a plurality of ring-shaped grooves formed at the inner surface section of the attachment hole of the main shaft at a predetermined interval along an axial center of the main shaft, the plurality of ring-shaped grooves and the plurality of elastic engagement pieces being arranged in an alternating manner along the axial center, and the formation of the plurality of ring-shaped grooves allowing the plurality of elastic engagement pieces to be integrally formed with the main shaft.

According to another embodiment of the present invention there is provided a tool holder attachment structure, wherein: the elastic engagement pieces are sloped relative to a plane perpendicular to the axial center of the main shaft.

According to another embodiment of the present invention there is provided a tool holder attachment structure, wherein: toward an inner perimeter, the elastic engagement pieces are each sloped toward a wider end of a tapered shape of the attachment hole.

According to another embodiment of the present invention there is provided a tool holder attachment structure, wherein: the elastic engagement pieces are formed parallel to a plane perpendicular to the axial center of the main shaft.

According to another embodiment of the present invention there is provided a tool holder attachment structure, further comprising: a plurality of grooves extending longitudinally along the tapered attachment hole being formed at the inner surface section of the tapered attachment hole in a symmetrical arrangement relative to the axial center.

According to another embodiment of the present invention there is provided a tool holder attachment structure, further comprising: an elastic flange extending radially from the tool holder abuts an outer end surface of the main shaft and elastically deforms parallel with the axial center when the tool holder is mounted on the main shaft.

According to another embodiment of the present invention there is provided a tool holder attachment structure, further comprising: a ring-shaped groove being formed at a radially inward position on the elastic flange, the elastic flange being formed with a ring shape, and a ring-shaped sloped groove being formed at a radially outward position on the elastic flange.

According to another embodiment of the present invention there is provided a tool holder attachment structure, wherein: the plurality of elastic engagement pieces are a plurality of collar-shaped members secured to the inner surface section of the tapered attachment hole of the main shaft.

According to another embodiment of the present invention there is provided a tool holder attachment structure, wherein: a cross-section shape of the tapered attachment hole and the shank along a plane perpendicular to the axial center is a non-circular shape effective to transfer a rotational torque during a use of the tool, whereby the rotational torque is transferred from the tapered attachment hole of the main shaft to the shank without using a key.

According to another embodiment of the present invention there is provided a tool holder attachment structure, for removably securing a tool holder with a tool to a main shaft of a machining tool, comprising: at least a shank on the tool holder, the shank having at least a tapered outer perimeter surface, the main shaft including a tapered attachment hole, means for elastically securing the shank in the attachment hole of the main shaft and eliminating vibration and attachment failure during a use of the machining tool and the tool holder attachment, at least a plurality of elastic engagement pieces in the means for elastically securing, the elastic engagement pieces arrayed concentrically around an inner perimeter section of the attachment hole, the elastic engagement pieces extending away from the main shaft and elastically abutting the tapered outer perimeter surface of the shank during an insertion of the shank into the attachment hole, and the elastic engagement pieces elastically deforming in at least a first radial direction during the insertion and the use, whereby the means for elastically securing enables the elastic engagement pieces to absorb a plurality of use vibrations while maintaining a secure attachment between the main shaft and the tool holder.

According to another alternative embodiment of the present invention there is provided a tool holder attachment structure, further comprising: a plurality of ring-shaped grooves on the inner perimeter section of the attachment hole, the plurality of ring-shaped grooves arrayed alternatingly with respective the elastic engagement pieces in an axial direction along the inner perimeter section of the attachment hole, the plurality of ring-shaped grooves including smooth radius contours at bottom portions thereof, thereby minimizing elastic stress concentration, and the plurality of elastic engagement pieces extending integrally from the main shaft, thereby simplifying manufacturing and assembly of the main shaft and the tool holder with a uniform force.

According to another alternative embodiment of the present invention there is provided a tool holder attachment structure, wherein: the plurality of elastic engagement pieces, each having a first length, extends from each respective ring-shaped groove to respective the inner perimeter section of the tapered attachment hole, an end of each the elastic engagement piece arrayed in a plane parallel to the tapered outer perimeter surface of the shank, whereby each the elastic engagement piece contacts the tapered outer perimeter surface simultaneously during the insertion to provide easy alignment and tight attachment, and the first length of each respective the elastic engagement piece being dependant upon a position on the tapered attachment hole relative to the tapered outer perimeter surface of the shank.

In another embodiment of the present invention there is presented a tool holder attachment structure where the shank is fitted and secured in the attachment hole with the plurality of elastic engagement pieces disposed on the inner surface of the attachment hole abutting the tapered outer perimeter surface of the shank of the tool holder and being elastically deformed slightly in the radial direction.

Consequently, the plurality of elastic engagement pieces are elastically deformed radially to tightly abut the tapered outer perimeter surface of the shank of the tool holder, and these elastic engagement pieces allow the entire shank to be fitted into the attachment hole of the main shaft with a uniform force. This tight fit provides firm securing of the tool holder to the main shaft. Vibrations generated at the main shaft can consequently be dampened even when the main shaft is rotated at high speeds, thus improving machining precision.

An alternative embodiment of the present invention provides a plurality of grooves extending longitudinally along the attachment hole formed at the inner surface section of the attachment hole in a symmetrical arrangement relative to the axial center.

Also, it would be desirable to have an elastic flange abut an outer end surface of the main shaft and elastically deforms toward the axial center when the tool holder is mounted on the main shaft. In this case, it would also be possible to have: the elastic flange formed with a ring shape, a ring-shaped groove formed at a radially inward position on the elastic flange, and a ring-shaped sloped groove formed at a radially outward position on the elastic flange.

Another embodiment of the present invention provides a plurality of elastic engagement pieces formed as a plurality of collar-shaped members secured to the inner surface section of the attachment hole of the main shaft. In this case, it would also be possible to have a cross-section shape of the attachment hole and the shank along a plane perpendicular to the axial center form a non-circular shape capable of transferring rotational torque so that rotational torque can be transferred from the attachment hole of the main shaft to the shank without using a key.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
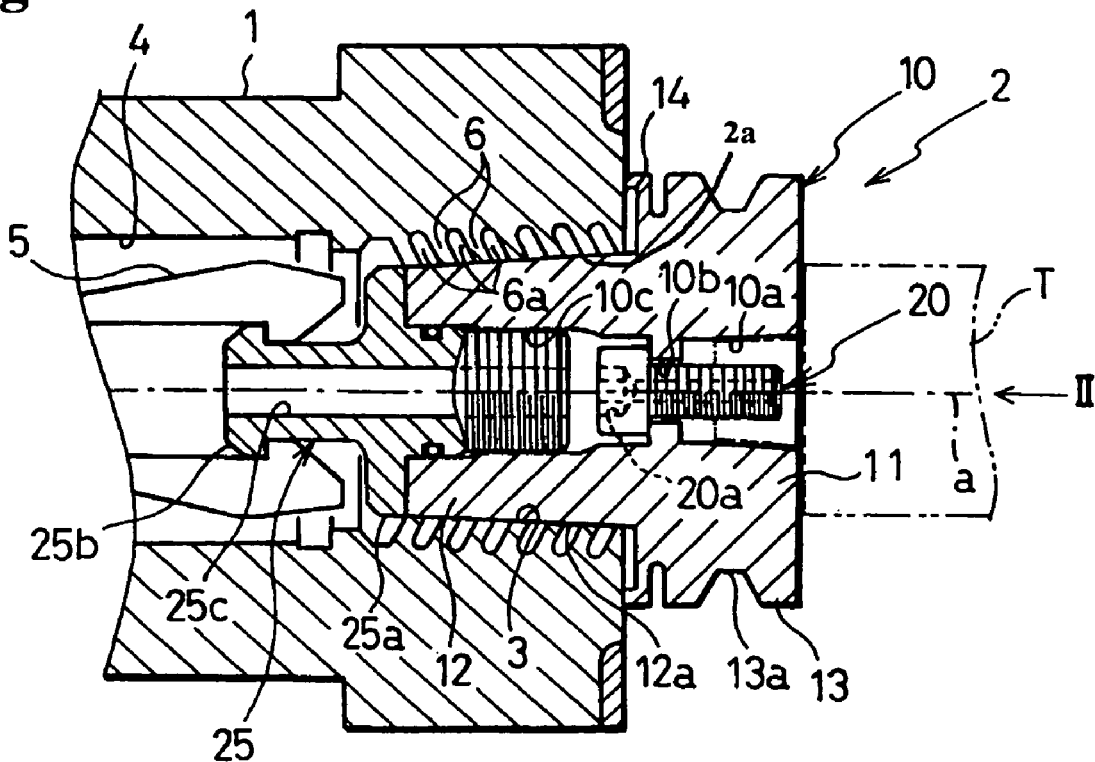
FIG. 1 is a vertical cross-section view of a tool holder including a section of a main shaft.

Referring now to FIG. 1, a tool holder 2, includes a main holder unit 10, mounted on a main shaft 1 of a machine tool (not shown). A tapered attachment hole 3 extends inward from an end of main shaft 1. Attachment hole 3 is larger at a first end of main shaft 1 and narrows towards a center axis, as shown. An axial center of attachment hole 3 is aligned with an axial center a of main shaft 1.

An end surface of main shaft 1 is a flat surface perpendicular to axial center a. A holding hole 4, inside main shaft 1, extends continuously with attachment hole 3. A collet 5, is disposed at the end of a draw bar extending from a retraction mechanism (not shown). Collet 5 retracts and secures a shank 12 of tool holder 1 in attachment hole 3 of main shaft 1.

Tool holder 2 includes main holder unit 10, a locking bolt 20, and a pull stud 25. Main holder unit 10 includes a tool support 11 for attaching a tool T, a shank 12 having a tapered perimeter surface 12a, and a flange 13.

Shank 12 is wider at a first end and narrows towards axial center a, as shown. Flange 13, including a ring-shaped elastic flange 14, extends around main holder unit 10. Flange 13 and ring-shaped elastic flange 14 have diameters larger than that of attachment hole 3. Tool support 11, shank 12, and a flange 13 are integrally formed during manufacture.

A tapered hole 10a, an insertion hole 10b, and a threaded hole 10c extend in series inside main holder unit 10. During assembly, a locking bolt 20 is inserted through threaded hole 10c into insertion hole 10b. Locking bolt 20 includes a threaded section which projects through insertion hole 10b and extends into tapered hole 10a.

A connecting projection at the base of tool T tightly engages tapered hole 10a and threadably meshes with threaded locking bolt 20 to lock tool T to tool holder 1. Tool support 11 includes tapered hole 10a, insertion hole 10b, and locking bolt 20.

A pull stud 25 meshes with threaded hole 10c at a base end of main holder unit 10. A collar 25a extends radially from pull stud 25 abutting the end of shank 12. Since collar 25a has a radial surface in contact with shank 12 and threadably engages threaded hole 10c, collar 25a provides strong lateral support to secure pull stud 25, and assists vibration compensation, as will be explained.

An engagement section 25b, extends at the base end of pull stud 25 and positively engages collet 5 and draws inward shank 12 by pulling the draw bar (not shown) to the left in FIG. 1.

A hexagonal hole 20a extends axially in locking bolt 20 to allow easy access for a hexagonal wrench (not shown) to engage and rotate locking bolt 20.

An insertion hole 25c extends axially in pull stud 25 to provide access to locking hexagonal hole 20a.

A plurality of elastically deformable engagement pieces 6 extend from attachment hole 3 to engage shank 12. Elastic engagement pieces 6 extend from an inner surface of attachment hole 3 toward the axial center a of main shaft 1.

When assembled, elastic engagement pieces 6 abut the tapered outer perimeter surface 12a of shank 12 and are elastically deformed in the radial direction.

A plurality of ring-shaped grooves 6a are arrayed on the inner surface of attachment hole 3 of main shaft 1, positioned at predetermined axial intervals alternating with elastic engagement pieces 6. Ring-shaped grooves 6a are formed opposite outer perimeter surface 12a to allow elastic engagement pieces 6 to extend integrally from main shaft 1.

Each elastic engagement piece 6 is formed as a suitably rigid elastic member with a high elastic modulus which makes them more easily deformed during assembly due to the slope outer perimeter end, as will be explained.

An axial thickness of each elastic engagement piece 6 is pre-selected to provide an appropriate elastic modulus.

The outer perimeter end of each elastic engagement piece 6 is sloped relative to a plane perpendicular to the axis of main shaft 1, extending along the tapered shape of shank 12 (and attachment hole 3). The plurality of elastic ring-shaped grooves 6a are sloped grooves oriented toward the wider end of shank 12.

The inner perimeter radius of the plurality of elastic engagement pieces 6 decreases toward the narrow end of shank 12 to allow a tapered outer perimeter surface 2a of tool holder 2 to securely engage attachment hole 3.

During engagement of elastic engagement pieces 6 with shank 12, the distance of respective elastic engagement pieces 6 from axial center a is smaller at the bottom side of shank 12 (to the left in FIG. 1). The bottoms of ring-shaped grooves 6a are positioned at roughly a fixed radius and distance from axial center a. Consequently, a radial width of the plurality for elastic engagement pieces 6 is longer toward the bottom (narrower) side of shank 12

Figure 2:
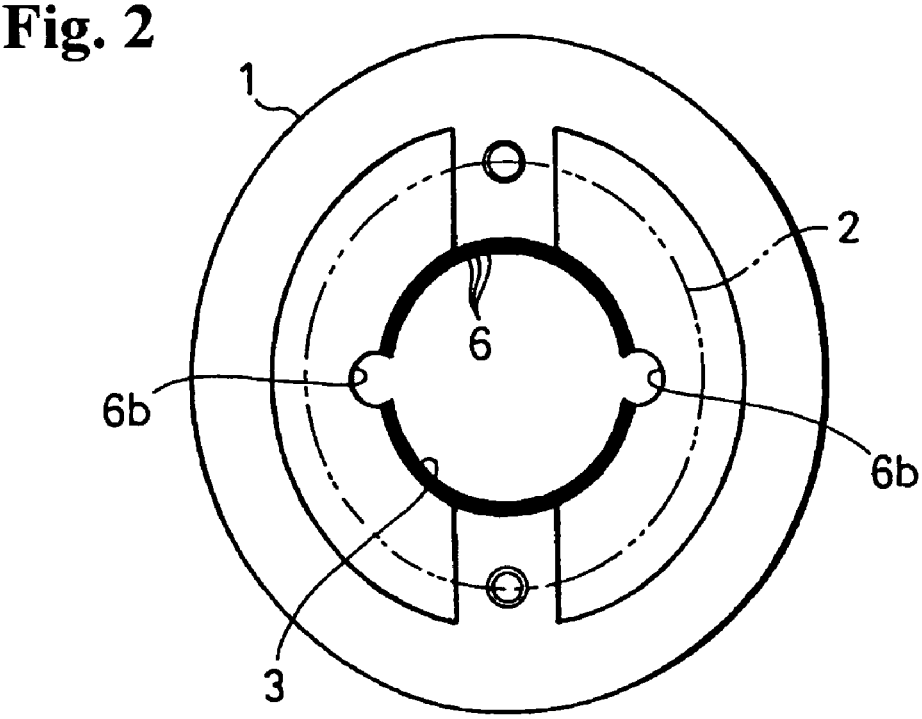
FIG. 2 is an end-view a tool holder from FIG. 1, seen from arrow II in FIG. 1.

Referring now to FIG. 2, two grooves 6b, are symmetrically formed on the inner surface of attachment hole 3 around axial center a. Grooves 6b extend longitudinally along a length of attachment hole 3 relative to shank 12. Consequently, elastic engagement pieces 6 are divided in two section extending along the inner perimeter of attachment hole 3. Each section of elastic engagement pieces 6 extends in an arc of approximately 170 degrees opposite outer perimeter surface 12a.

Combining ring-shaped grooves 6a and the division of elastic engagement pieces 6 by grooves 6b allows elastic engagement pieces 6 to be easily elastically deformed during use. In other words, these structures reduce the effective elastic modulus of elastic engagement pieces 6.

A key (not shown) may be mounted in each groove 6b and allow rotational torque transfer from main shaft 1 to tool holder 2. When tool holder 2 mounts on main shaft 1, the keys slidably engage key grooves (also not shown) on tool holder 2, allowing effective torque transfer during use.

Figure 3:
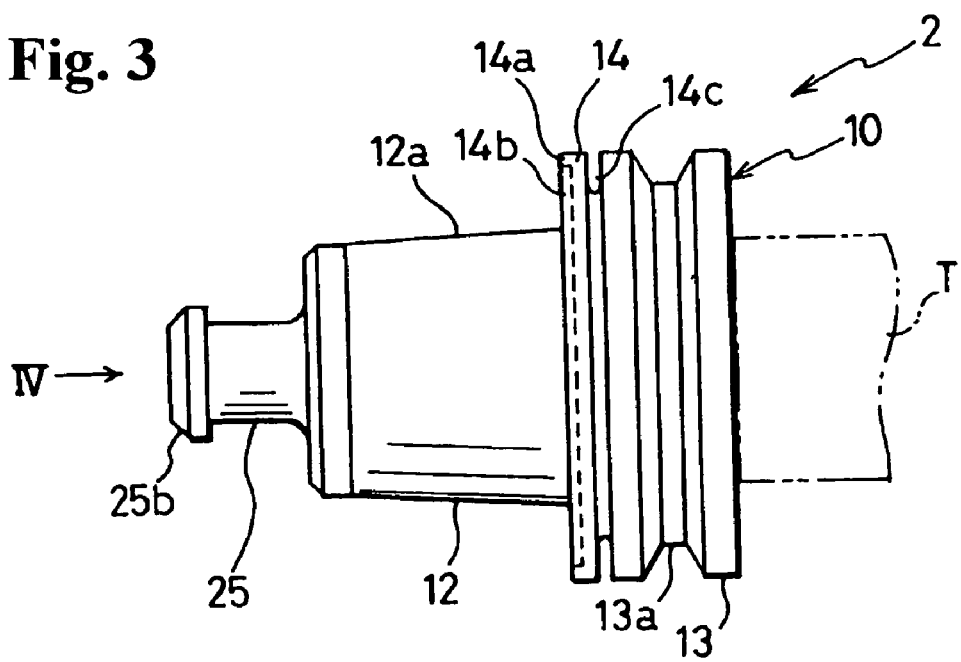
FIG. 3 is a side-view of a tool holder.
Figure 4:
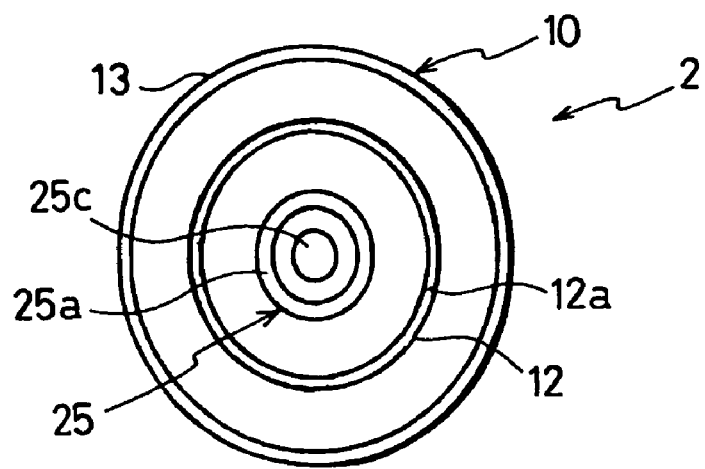
FIG. 4 is an end view of a tool holder form FIG. 3, seen from arrow IV in FIG. 3.

Referring now to FIGS. 3 and 4, the outer perimeter section of flange 13 includes an integrally formed engagement groove 13a that engages an arm of an automatic tool changing device (not shown).

A ring-shaped elastic flange 14 is formed at a base of flange 13 and has a high elastic modulus. When mounting main holder unit 10 on main shaft 1, elastic flange 14 is elastically deformed toward axial center a when it abuts the outer end surface of main shaft 1 during insertion. Elastic flange 14 is formed parallel with a plane perpendicular to axial center a of main shaft 1.

A ring-shaped groove 14b is formed at a radially inward position on one side of elastic flange 14. A ring-shaped groove 14c is formed radially inward on elastic flange 14. A ring-shaped engagement projection 14a, on an outer perimeter of elastic flange 14, abuts the end surface of main shaft 1 during use. Ring-shaped groove 14c and ring-shaped groove 14b allow easy adjustment of the elastic modulus of elastic flange 14 to an appropriate value.

Figure 5:
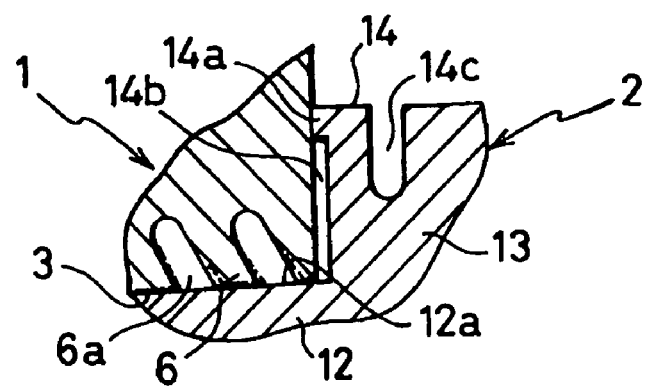
FIG. 5 is a detail drawing of a tool holder.

Referring now to FIG. 5, during assembly, shank 12 of tool holder 2 is inserted into attachment hole 3 of main shaft 1. The end surface of main shaft 1 abuts elastic flange 14 before shank 12 closely abuts the plurality of elastic engagement pieces 6. Collet 5, at the end of the draw bar draws a shank 12 of tool holder 2 toward the base of main shaft 1. This drawing, causes elastic flange 14 and the plurality of elastic engagement pieces 6 to elastically deform slightly, providing a tight and secure fit. When pull stud 25 is drawn by the retraction mechanism (not shown), ring-shaped elastic flange 14 elastically deforms radially.

When the tapered outer perimeter surface 12a (solid line) contacts elastic engagement pieces 6 (solid line), and drawing occurs, elastic engagement pieces 6 are slightly deformed radially (dotted line).

By having elastic engagement pieces 6 elastically deform radially and abut tightly against outer perimeter surface 12a, the entire shank 12 is very firmly and removably fitted in attachment hole 3 with a uniform force along the entire length of shank 12. Consequently, the entire surface and length of shank 12 is positively engaged with main shaft 1 which reduces operational vibration.

Since elastic flange 14 elastically contacts the end surface of main shaft 1, small gaps between main shaft 1 and tool holder 2 are easily eliminated while firmly fitting shank 12 inside attachment hole 3. These two elastic engagement mechanisms prevent undesirable vibration in main shaft 1 and tool holder 2 even when main shaft 1 is operated at high speeds. As discussed above, eliminating undesirable vibrations significantly improves machining precision.

Since elastic flange 14 engages the end surface of main shaft 1 at a position where its radius from axial center a is maximized (large), vibrations and flexure in tool holder 2 are greatly reduced, thereby improving the stability of a tool in tool holder 1.

Since elastic engagement pieces 6 extend from the outer perimeter of attachment hole 3, along the axis of shank 12, the entire shank 12 is easily and reliably secured against the outer surface of elastic engagement pieces 6 with a uniform force.

Additionally, the plurality of ring-shaped grooves 6a are integrally formed at predetermined uniform intervals on the inner surface of attachment hole 3 allowing elastic engagement pieces 6 to be easily and integrally formed with main shaft 1. This integral formation simplifies the structure of main holder unit 10 and reduces manufacturing costs.

The elasticity of elastic engagement pieces 6 is regulated and controlled by multiple mechanisms. First, the aforementioned material selection. Second, the elasticity of elastic engagement pieces 6 is regulated by forming elastic engagement pieces 6 in a slope along a plane generally perpendicular to a to axial center a. Second, ends of elastic engagement pieces 6 are sloped relative to shank 12 and allow uniform contact during insertion. Third, elastic engagement pieces 6 are split by grooves 6b into two elastic arcs. Furthermore, grooves 6b can be used for mounting connecting keys (not shown) to allow torque transfer to tool holder 2. Together, these mechanisms allow uniform tight fitting of shank 12 into attachment hole 3 while permitting shank 12 to be formed of a strong material.

An additional benefit of sloping the outer ends of elastic engagement pieces 6 allows elastic engagement pieces 6 to be elastically deformed toward the wider end of tapered shank 12. From this state, the inner perimeter surface (outer ends) of the elastic engagement pieces 6 are locked by friction to tapered outer perimeter surface 12a. The restorative force of elastic engagement pieces 6 acts to move tool holder 2 toward a base end (to the left in FIG. 1) thereby increasing the retraction force that draws tool holder 2 into main shaft 1 and allowing a smaller retraction mechanism.

During release of the retraction mechanism, after disengaging collet 5, the restorative force of elastic flange 14 causes tool holder 2 to move slightly away from main shaft 1, and allows easy removal of main holder unit 10. When necessary, an axial thickness of elastic flange 14 may be modified to accommodate different elastic needs and grooves 14*b*, 14*c* may be either eliminated or differently formed.

In additional embodiments, where desirable, elastic engagement pieces 6 and elastic flange 14 may be formed to abut main shaft 1 simultaneously or elastic engagement pieces 6 may engage shank 12 prior to elastic flange 14 contacting main shaft 1. Depending upon design needs, alternative contact timing choices may be selected.

Figure 6:
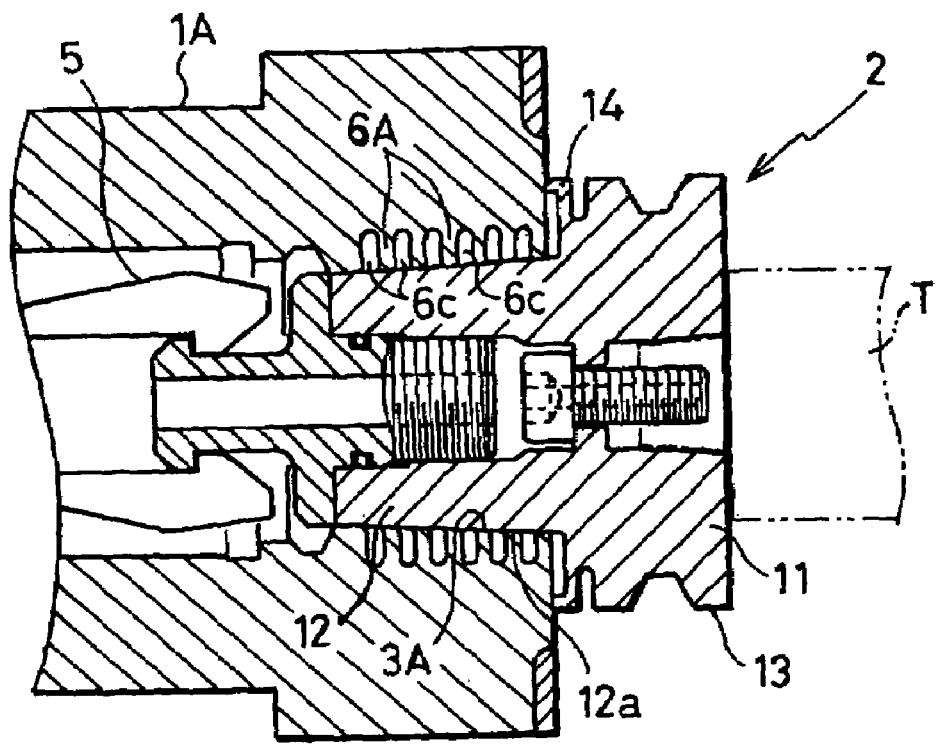
FIG. 6 is a vertical cross-section of a second embodiment of the present invention.

Referring now to FIG. 6, an alternative embodiment of a main shaft 1A includes a plurality of elastic engagement pieces 6A extending toward shank 12 parallel to a plane perpendicular with axial center a.

Elastic engagement pieces 6A are formed integrally with main shaft 1A and elastically engage the outer surface of shank 12 during assembly.

A plurality of ring-shaped grooves 6*c*, inter-spaced with elastic engagement pieces 6A, are parallel with a plane perpendicular with axial center a of main shaft 1A on the inner surface of attachment hole 3A.

During assembly, shank 12 is drawn inward by the draw bar of the retraction mechanism. During shank 12 movement, elastic engagement pieces 6A receive forces generally perpendicular to the inner surface of attachment hole 3A. Consequently, elastic engagement pieces 6A under slight elastic deformation radially.

Figure 7:
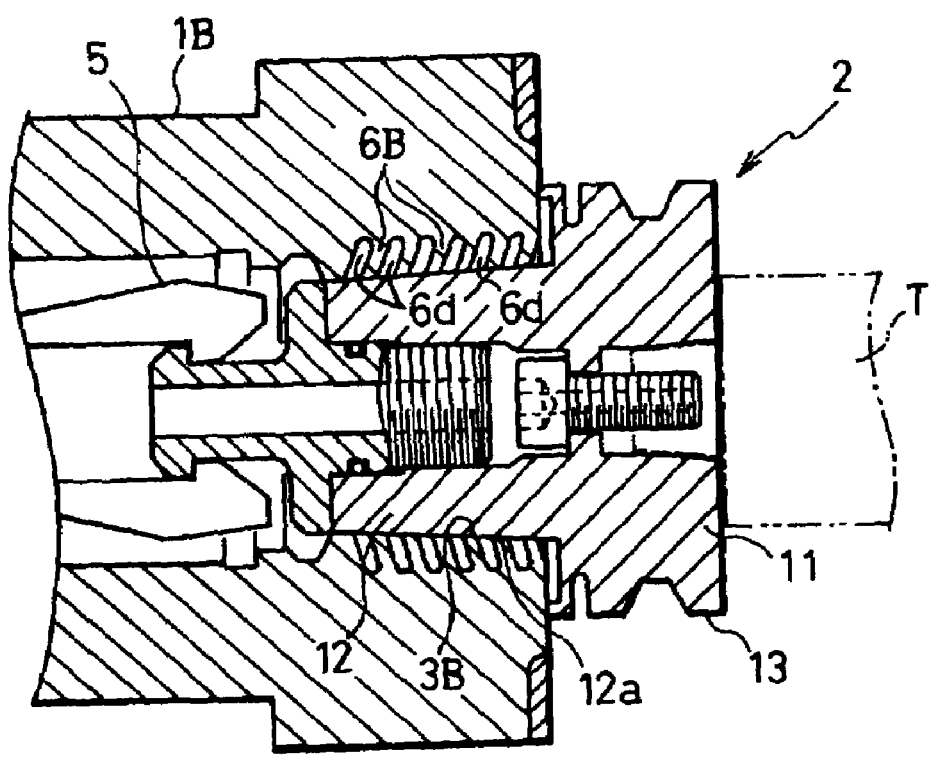
FIG. 7. Is a vertical cross-section of a third embodiment of the present invention.

Referring now to FIG. 7, another alternative embodiment of a main shaft 1B includes a plurality of elastic engagement pieces 6B extending in a sloped direction toward the narrower end of shank 12 relative to a plane perpendicular with axial center a of main shaft 1B.

Elastic engagement pieces 6B are integrally formed with main shaft 1B. A plurality of ring-shaped grooves 6*d* are formed on the inner wall of an attachment hole 3B at predetermined intervals along axial center a. Ring-shaped grooves 6*d* alternate with elastic engagement pieces 6B.

During assembly, when tool support 11 is secured in attachment hole 3B, elastic engagement pieces 6B are elastically deformed slightly in the radial direction. In this state, due to the formation of elastic engagement pieces 6B and ring-shaped grooves 6*d*, elastic engagement pieces 6B apply an additional outward force to tool holder 2, away from main shaft 1B. This additional outward force allows easy removal of tool holder 2 from main shaft 1B

Figure 8:
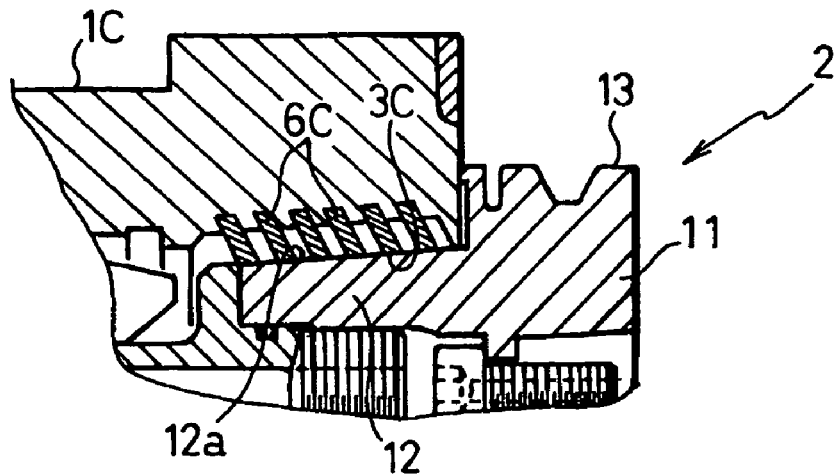
FIG. 8 is a close-up schematic vertical cross-section of another embodiment of a tool holder and a main shaft.

Referring now to FIG. 8, another alternative embodiment of a main shaft 1C includes a plurality of collar-shaped members 6C separately secured in respective ring shaped grooves along an inner surface of an attachment hole 3C.

Collar-shaped members 6C slope relative to a plane perpendicular with the axial center (not shown) of main shaft 1C and extend toward the wide end of the tapered shape of attachment hole 3C.

In the present embodiment, collar-shaped members 6C may be alternatively formed as rings or a plurality of section symmetrical around the axial center.

As another alternative, collar-shaped members 6C may also formed to project roughly in the same direction as elastic engagement pieces 6A or 6B, according to the previous description.

The present embodiment allows collar-shaped members 6C to be selected according to a desired elastic modulus or material compatibility with shank 12, thereby allowing easy adaptability to customer and manufacturer demand.

Figure 9:
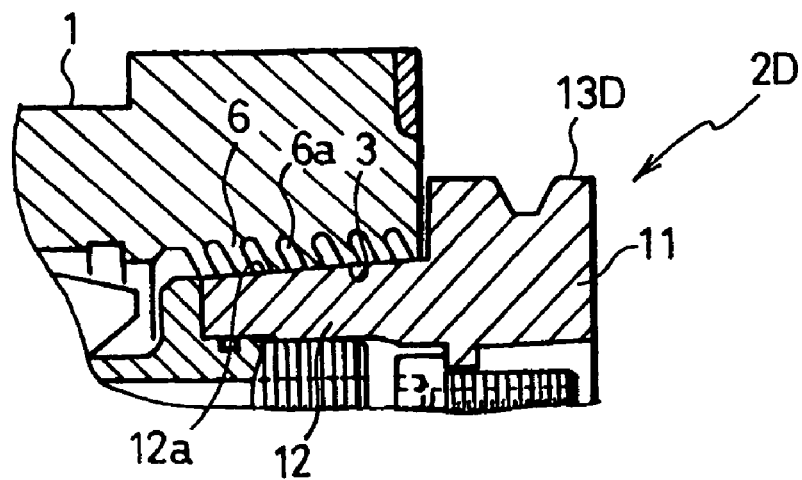
FIG. 9 is a close-up schematic vertical cross-section of another embodiment of a tool holder and a main shaft.

Referring now to FIG. 9, another alternative embodiment of a tool holder 2D exist without elastic flange 14, sloped groove 14*b*, ring-shaped groove 14*c*, or projection 14*a* on a flange 13D. A gap exists between the end surface of main shaft 1 and where elastic flange 14 existed in previous embodiments. This embodiment is particularly useful where there is minimal need for the benefits, including additional security and vibration, provided by items previously listed.

Figure 10:
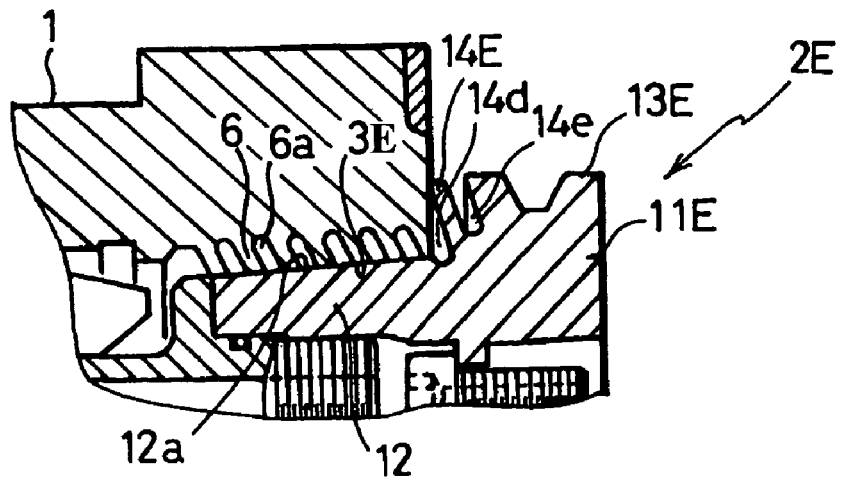
FIG. 10 is a close-up schematic vertical cross-section of another embodiment of a tool holder and a main shaft.

Referring now to FIG. 10, another embodiment of the present invention includes a tool holder 2E having an elastic flange 14E. Elastic flange 14E is sloped relative to a plane perpendicular to a main shaft 1 toward the narrow end of the tapered shape of an attachment hole 3E. A ring-shaped groove 14*e* and sloped grooves 14*d* are sloped toward the narrow end of attachment hole 3E. Elastic flange 14E is integrally formed with main 10 and extends between sloped grooves 14*d* and ring shaped groove 14*e*.

Elastic flange 14E, interacting with sloped ring-shaped groove 14*e* and sloped grooves 14*d*, contacts the outer end surface of main shaft 1 and provides both easy removal of tool holder 2E and operational stability and security between tool holder 2E and main shaft 1.

Figure 11:
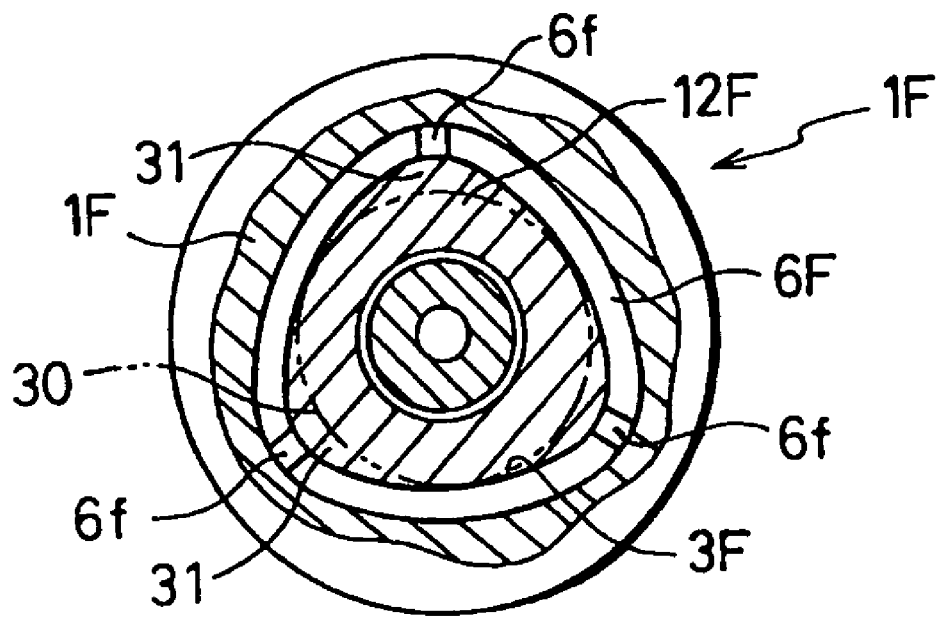
FIG. 11 is a vertical-section of a tool holder and a main shaft along a plane perpendicular to the axial center according to an alternative embodiment of the present invention.

Referring now to FIG. 11, an alternative embodiment of a main shaft 1F includes a plurality of elastic engagement pieces 6F, extending from an attachment hole 3F to engage a shank 12F.

In the present embodiment, a cross-sectional shape of attachment hole 3F, of main shaft 1F, and shank 12F, along a plane perpendicular with the axial center of shank 12F, forms a non-circular triangular shape, as shown.

The non-circular triangular shape is formed by three projections 31 formed at roughly 120 degree intervals along an outside of an inscribed reference circle 30. Projections 31 allow easy rotational torque transfer from attachment hole 3F of main shaft 1F, to shank 12F, without the use of keys.

During use, since projections 31 cannot rotate beyond the apex of their respective non-circular triangular positions without encountering increased resistance, they operate to transfer torque.

Three grooves 6F are formed at symmetrical positions, on the sides of attachment hole 3F, relative to the axial center of main shaft 1F, at the corners at the outer perimeter section of shank 12F.

Figure 12:
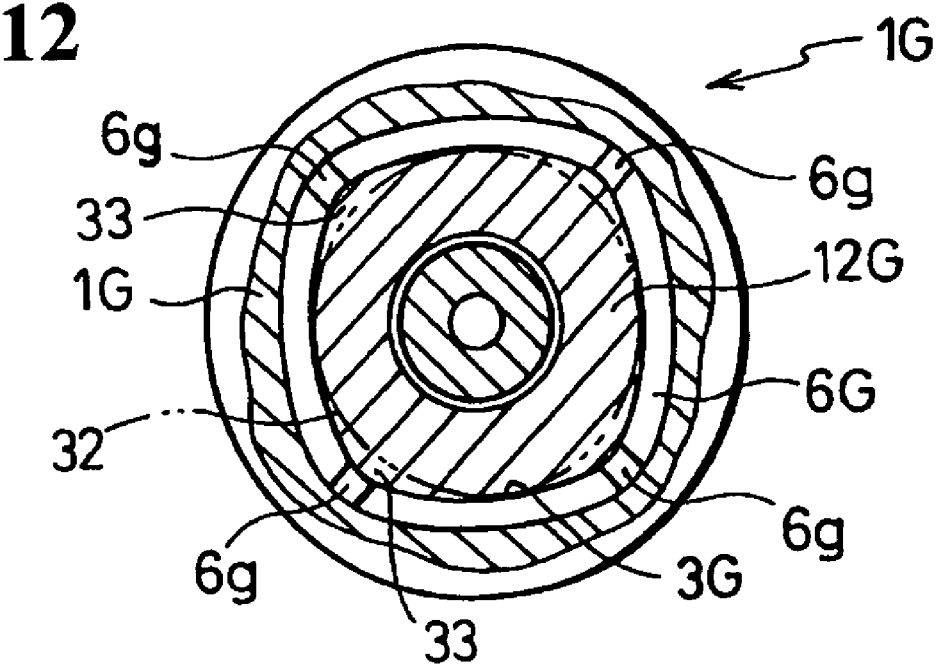
FIG. 12 is a vertical-section of a tool holder and a main shaft along a plane perpendicular to the axial center according to an alternative embodiment of the present invention.

Referring now to FIG. 12, an alternative body of a main shaft 1G, includes a plurality of elastic engagement pieces 6G, extending from an attachment hole 3G to engage a shank 12G.

In the present embodiment, a cross-sectional shape of attachment hole 3G, of main shaft 1G, and shank 12G, along a plane perpendicular with the axial center of shank 12G, forms a non-circular four-sided shape, as shown.

The non-circular four-sided shaped is formed by four projections 33, formed at roughly 90 degree intervals along an outside of an inscribed circle 32. Projections 33 allow easy rotational torque transferred from attachment hole 3G of main shaft 1G, to shank 12G, without the use of keys.

During use, since projections 33 cannot rotate beyond the apex of their respective non-circular four-sided shape without encountering increased resistance, they operate to transfer torque.

Four grooves 6*g* are formed at symmetrical positions, on the sides of attachment hole 3G, relative to the axial center of main shaft 1G, at the corners at the outer perimeter section of shank 12G.

In addition to the non-circular shapes indicated in the embodiments shown in FIGS. 11 and 12, other non-circular shapes symmetrical around the axial center may be used to provide the same benefit.

In other alternative embodiments, the grooves formed relative to elastic engagement pieces 6-6G may be optionally omitted. Other embodiments could easily position the elastic engagement pieces, having varying number, thickness, and elasticity, at different positions according to a desired retaining and elastic force.

Another embodiment allows the grooves alternating with the elastic engagement pieces to have varying widths along the axial center of the main shaft to easily adapt to different holding requirements.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The invention claimed is:

1. A tool holder attachment structure, for removably securing a tool holder with a tool in a tapered attachment hole of main shaft of a machining tool, comprising:
    a shank having a tapered outer perimeter surface;
    said shank provided on said tool holder;
    a plurality of elastic engagement pieces abutting an outer perimeter surface of said tapered outer perimeter surface of said tool holder and being elastically deformable in a radial direction during a fitting; and
    a plurality of ring shaped grooves formed at said inner surface section of said attachment hole of said main shaft at a predetermined interval along an axial center of said main shaft, said plurality of ring shaped grooves and said plurality of elastic engagement pieces being arranged in an alternating manner along said axial center;
    said formation of said plurality of ring shaped grooves allowing said plurality of elastic engagement pieces to be integrally formed with said main shaft;
    said plurality of elastic engagement pieces disposed at an inner surface section of said tapered attachment hole of said main shaft; and
    said shank in said tapered attachment hole of said main shaft and said tool holder secured to said main shaft during said fitting with said plurality of elastic engagement pieces elastically deformed in said radial direction.

2. The tool holder attachment structure, according to claim 1, wherein: said elastic engagement pieces are sloped relative to a plane perpendicular to said axial center of said main shaft.

3. The tool holder attachment structure, according to claim 2, wherein toward an inner perimeter, said elastic engagement pieces are each sloped toward a wider end of a tapered shape of said attachment hole.

4. The tool holder attachment structure, according to claim 1, wherein said elastic engagement pieces are formed parallel to a plane perpendicular to said axial center of said main shaft.

5. The tool holder attachment structure, according to claim 3, further comprising:
    a plurality of grooves extending longitudinally along said tapered attachment hole being formed at said inner surface section of said tapered attachment hole in a symmetrical arrangement relative to said axial center.

6. The tool holder attachment structure, according to claim 1, further comprising:
    an elastic flange extending radially from said tool holder abuts an outer end surface of said main shaft and elastically deforms parallel with said axial center when said tool holder is mounted on said main shaft.

7. The tool holder attachment structure, according to claim 5, further comprising:
    an elastic flange extending radially from said tool holder abuts an outer end surface of said main shaft and elastically deforms parallel with said axial center when said tool holder is mounted on said main shaft.

8. The tool holder attachment structure, according to claim 6, further comprising:
    a ring shaped groove being formed at a radially inward position on said elastic flange; said elastic flange being formed with a ring shape; and
    a ring shaped sloped groove being formed at a radially outward position on said elastic flange.

9. The tool holder attachment structure, according to claim 1, wherein said plurality of elastic engagement pieces are a plurality of collar shaped members secured to said inner surface section of said tapered attachment hole of said main shaft.

10. The tool holder attachment structure, according to claim 1, wherein a cross section shape of said tapered attachment hole and said shank along a plane perpendicular to said axial center is a non circular shape effective to transfer a rotational torque during a use of said tool, whereby said rotational torque is transferred from said tapered attachment hole of said main shaft to said shank without using a key.

11. The tool holder attachment structure, according to claim 5, wherein a cross section shape of said tapered attachment hole and said shank along a plane perpendicular to said axial center forms a non circular shape effective to transfer a rotational torque during a use of said tool, whereby said rotational torque is transferred from said tapered attachment hole of said main shaft to said shank without using a key.

12. A tool holder attachment structure, for removably securing a tool holder with a tool to a main shaft of a machining tool, comprising:
    at least a shank on said tool holder;
    said shank having at least a tapered outer perimeter surface;

said main shaft including a tapered attachment hole;

means for elastically securing said shank in said attachment hole of said main shaft and eliminating vibration and attachment failure during a use of said machining tool and said tool holder attachment;

at least a plurality of elastic engagement pieces in said means for elastically securing;

said elastic engagement pieces arrayed concentrically around an inner perimeter section of said attachment hole;

said elastic engagement pieces extending away from said main shaft and elastically abutting said tapered outer perimeter surface of said shank during an insertion of said shank into said attachment hole;

said elastic engagement pieces elastically deforming in at least a first radial direction during said insertion and said use, whereby said means for elastically securing enables said elastic engagement pieces to absorb a plurality of use vibrations while maintaining a secure attachment between said main shaft and said tool holder;

a plurality of ring-shaped grooves on said inner perimeter section of said attachment hole;

said plurality of ring-shaped grooves arrayed alternatingly with respective said elastic engagement pieces in an axial direction along said inner perimeter section of said attachment hole;

said plurality of ring-shaped grooves including smooth radius contours at bottom portions thereof, thereby minimizing elastic stress concentration; and said plurality of elastic engagement pieces extending integrally from said main shaft, thereby simplifying manufacturing and assembly of said main shaft and said tool holder with a uniform force.

13. The tool holder attachment structure, according to claim 12, wherein:

said plurality of elastic engagement pieces, each having a first length, extends from each respective ring-shaped groove to respective said inner perimeter section of said tapered attachment hole;

an end of each said elastic engagement piece arrayed in a plane parallel to said tapered outer perimeter surface of said shank, whereby each said elastic engagement piece contacts said tapered outer perimeter surface simultaneously during said insertion to provide easy alignment and tight attachment; and said first length of each respective said elastic engagement piece being dependant upon a position on said tapered attachment hole relative to said tapered outer perimeter surface of said shank.

* * * * *